Feb. 21, 1967   L. C. SNITCHLER   3,305,291
LENSES FOR FOCUSING INFRARED UTILIZING ELEMENTS OF SILICON AND OF ZINC SULFIDE
Filed Nov. 27, 1963

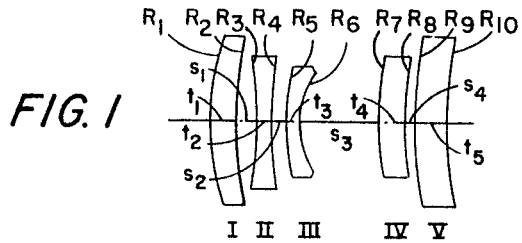

| LENS | MATERIAL | RADII | THICKNESS |
|---|---|---|---|
| I | Silicon | $R_1 = +127$ mm | $t_1 = 12.5$ mm |
|   |         | $R_2 = +325$    | $s_1 = 8.3$ |
| II | Zinc Sulfide | $R_3 = -935$ | $t_2 = 4.2$ |
|    |              | $R_4 = +487$ | $s_2 = 6.1$ |
| III | Zinc Sulfide | $R_5 = +227$ | $t_3 = 6.7$ |
|     |              | $R_6 = +91.5$ | $s_3 = 43.3$ |
| IV | Silicon | $R_7 = +416$ | $t_4 = 8.3$ |
|    |         | $R_8 = +1666$ | $s_4 = .8$ |
| V | Silicon | $R_9 = +231$ | $t_5 = 12.5$ |
|   |         | $R_{10} = +980$ | BF = 56.0 |

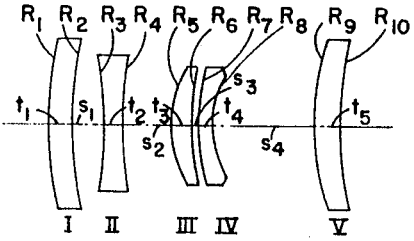

| LENS | MATERIAL | RADII | THICKNESS |
|---|---|---|---|
| I | Silicon | $R_1 = +160$ mm | $t_1 = 12.5$ mm |
|   |         | $R_2 = +321$ | $s_1 = 13.3$ |
| II | Zinc Sulfide | $R_3 = -450$ | $t_2 = 8.3$ |
|    |              | $R_4 = +296$ | $s_2 = 15.0$ |
| III | Silicon | $R_5 = +114$ | $t_3 = 8.3$ |
|     |         | $R_6 = +162$ | $s_3 = .08$ |
| IV | Zinc Sulfide | $R_7 = +113$ | $t_4 = 6.7$ |
|    |              | $R_8 = +70.5$ | $s_4 = 36.2$ |
| V | Silicon | $R_9 = +139$ | $t_5 = 12.5$ |
|   |         | $R_{10} = +362$ | BF = 51.0 |

LEWIS C. SNITCHLER
INVENTOR.

BY R. Frank Smith
F. M. Emerson Holmes
ATTORNEYS

3,305,291
LENSES FOR FOCUSING INFRARED UTILIZING ELEMENTS OF SILICON AND OF ZINC SULFIDE
Lewis C. Snitchler, Rochester, N.Y., assignor to Eastman Kodak Company, Rochester, N.Y., a corporation of New Jersey
Filed Nov. 27, 1963, Ser. No. 326,415
8 Claims. (Cl. 350—1)

The present invention relates to photographic objectives or the like, and particularly to lenses transmitting infrared radiation in the 3.0 to 4.5 micron wavelength region.

The object of the invention is to provide a lens highly corrected throughout this region of the spectrum. According to the invention, a lens with a speed of $f/1.2$ and even $f/1.0$ has been made up highly corrected for spherical aberration at $3.30\mu$ and $4.25\mu$ wavelength. The lens gives a relatively flat field with low rim ray discrepancy out to 20° half angle.

According to the invention, this high quality lens consists of five airspaced elements, three of which, including the outer two, are positive elements of silicon which has an index of refraction of 3.43 at $3.30\mu$ and 3.42 at $4.25\mu$. All three positive elements are meniscus convex to the front or long conjugate side of the lens. The other two elements are negative and made of zinc sulfide which has an index of refraction of 2.254 at $3.30\mu$ and 2.249 at $4.25\mu$ wavelength. One of the negative elements is the second element of the objective and is biconcave. The other negative element is either the third or the fourth element of the objective and is meniscus convex to the front. Thus, four out of the five elements are meniscus convex to the front.

The lens may be considered as consisting of two outer positive meniscus elements containing the two negative elements and an additional positive meniscus element which is preferably either the third or the fourth element. The largest airspace in the lens is immediately behind the meniscus negative element in the preferred embodiments and the rear surface of the meniscus negative element is the only one whose radius of curvature is less than the focal length of the lens. Furthermore, each of the outer positive elements has greater power than the extra positive element which is either the third or fourth element of the lens.

In the preferred embodiments of the invention, the outer positive elements have front surface radii of curvature between F and 5F, preferably between F and 2.5F, and a rear surface radius of curvature between 1.5F and 20F, preferably between 3F and 10F. The inner positive meniscus element has surface radii also within the broader ranges just mentioned.

Also in the preferred embodiments of the invention, the biconcave second element has a front surface radius of curvature between —3F and —20F, the — sign indicating a surface concave to the front, and a rear surface radius of curvature between 2F and 8F. The meniscus negative element which is either the third or fourth element has a front surface radius of curvature between F and 5F and a rear surface radius of curvature between 0.5F and F.

Preferably, the axial airspace immediately behind the rear surface of the meniscus negative element is between .25F and .5F and is larger than the other airspaces which are in general less than .18F.

In the accompanying drawings:
FIG. 1 shows a preferred embodiment of the invention with a relative aperture of $f/1.2$.
FIG. 2 gives the specifications for the lens shown in FIG. 1.
FIG. 3 shows a preferred embodiment of the invention working at $f/1.0$ relative aperture.
FIG. 4 gives the specifications for the lens shown in FIG. 3.

The specifications given in FIGS. 2 and 4 are repeated below as Examples 1 and 2 respectively.

EXAMPLE 1
[F = 100 mm. f/1.2]

| Lens | Material | Radii, mm. | Thickness, mm. |
|---|---|---|---|
| I | Silicon | $R_1 = +127$ | $t_1 = 12.5$ |
|   |         | $R_2 = +325$ | $s_1 = 8.3$ |
| II | Zinc Sulfide | $R_3 = -935$ | $t_2 = 4.2$ |
|    |              | $R_4 = +487$ | $s_2 = 6.1$ |
| III | Zinc Sulfide | $R_5 = +227$ | $t_3 = 6.7$ |
|     |              | $R_6 = +91.5$ | $s_3 = 43.3$ |
| IV | Silicon | $R_7 = +416$ | $t_4 = 8.3$ |
|    |         | $R_8 = +1666$ | $s_4 = .8$ |
| V | Silicon | $R_9 = +231$ | $t_5 = 12.5$ |
|   |         | $R_{10} = +980$ | BF = 56.0 |

EXAMPLE 2
[F = 100 mm. f/1.0]

| Lens | Material | Radii, mm. | Thickness, mm. |
|---|---|---|---|
| I | Silicon | $R_1 = +160$ | $t_1 = 12.5$ |
|   |         | $R_2 = +321$ | $s_1 = 13.3$ |
| II | Zinc Sulfide | $R_3 = -450$ | $t_2 = 8.3$ |
|    |              | $R_4 = +296$ | $s_2 = 15.0$ |
| III | Silicon | $R_5 = +114$ | $t_3 = 8.3$ |
|     |         | $R_6 = +162$ | $s_3 = .08$ |
| IV | Zinc Sulfide | $R_7 = +113$ | $t_4 = 6.7$ |
|    |              | $R_8 = +70.5$ | $s_4 = 36.2$ |
| V | Silicon | $R_9 = +139$ | $t_5 = 12.5$ |
|   |         | $R_{10} = +862$ | BF = 51.0 |

I claim:
1. An infrared transmitting objective comprising aligned and airspaced in order from the front, long conjugate, side, a positive meniscus element of silicon convex to the front; a negative biconcave element of zinc sulfide; third and fourth elements, one of which is positive of silicon and the other of which is negative of zinc sulfide; and a fifth element which is positive of silicon, third, fourth and fifth elements all being meniscus convex to the front.

2. An objective according to claim 1 having substantially the specifications given below where R is the radius of curvature of the surfaces numbered from the front; + and — respective indicate radii convex and concave to the front; $t$ and $s$ are the axial thicknesses of the elements and airspaces also numbered from the front and F is the focal length of the lens:

| Lens | Radii | Thicknesses |
|---|---|---|
| I | $R_1 = +1.3F$ | $t_1 = .13F$ |
|   | $R_2 = +3.3F$ | $s_1 = .08F$ |
| II | $R_3 = -9.4F$ | $t_2 = .04F$ |
|   | $R_4 = +4.9F$ | $s_2 = .06F$ |
| III | $R_5 = +2.3F$ | $t_3 = .07F$ |
|   | $R_6 = +.9F$ | $s_3 = .43F$ |
| IV | $R_7 = +4.2F$ | $t_4 = .08F$ |
|   | $R_8 = +16.7F$ | $s_4 = .01F$ |
| V | $R_9 = +2.3F$ | $t_5 = .13F$ |
|   | $R_{10} = +9.8F$ | |

3. An objective according to claim 1 having substantially the specifications given below where R is the radius of curvature of the surfaces numbered from the front; + and − respectively indicate radii convex and concave to the front; $t$ and $s$ are the axial thicknesses of the elements and airspaces also numbered from the front and F is the focal length of the lens:

| Lens | Radii | Thicknesses |
|---|---|---|
| I | $R_1 = +1.6F$ | $t_1 = .13F$ |
|   | $R_2 = +3.2F$ | $s_1 = .13F$ |
| II | $R_3 = -4.5F$ | $t_2 = .08F$ |
|   | $R_4 = +3.0F$ | $s_2 = .15F$ |
| III | $R_5 = +1.1F$ | $t_3 = .08F$ |
|   | $R_6 = +1.6F$ | $s_3 = .001F$ |
| IV | $R_7 = +1.1F$ | $t_4 = .07F$ |
|   | $R_8 = +.7F$ | $s_4 = .36F$ |
| V | $R_9 = +1.4F$ | $t_5 = .13F$ |
|   | $R_{10} = +3.6F$ | |

4. An infrared transmitting objective comprising five airspaced aligned elements, three of them, including the first and the fifth, numbered from the front, long conjugate, side, being meniscus silicon elements convex to the front, each with a front surface radius of curvature between F and 5F and a rear surface radius of curvature between 1.5F and 20F, the second element being a biconcave zinc sulfide element with a front surface radius of curvature between −3F and −20F and a rear surface radius of curvature between 2F and 8F, the other element being a negative zinc sulfide meniscus element convex to the front with a front surface radius of curvature between F and 5F and a rear surface radius of curvature between 0.5F and F.

5. An infrared transmitting objective comprising five airspaced aligned elements, including two outer positive meniscus elements of silicon convex to the front, two negative elements of zinc sulfide between the two outer elements, the front one of the negative elements being biconcave and the rear one being meniscus convex to the front, and, also between the two outer elements, a positive meniscus element of silicon convex to the front.

6. An objective according to claim 5 in which the two outer elements have front surface radii of curvature between F and 2.5F and rear surface radii of curvature between 3F and 10F.

7. An objective according to claim 5 in which the biconcave element has a front surface radius of curvature between −3F and −20F and a rear surface radius of curvature between 2F and 8F and in which the other negative element has a front surface radius of curvature between F and 5F and a rear surface radius of curvature between 0.5F and F, the axial airspace immediately behind the latter rear surface being between .25F and .5F.

8. An objective according to claim 5 in which the inner positive meniscus element has less power than either of the outer positive elements.

No references cited.

JEWELL H. PEDERSEN, *Primary Examiner.*

R. J. STERN, *Assistant Examiner.*